United States Patent [19]
Berther et al.

[11] Patent Number: 5,983,722
[45] Date of Patent: Nov. 16, 1999

[54] PIEZOBLOC ACCELEROMETER

[75] Inventors: Thomas Berther, Winterthur; Reto Calderara, Winterberg; Kurt Vollenweider, Humlikon; Peter Weber, Kreuzlingen, all of Switzerland

[73] Assignee: K.K. Holding AG, Winterthur, Switzerland

[21] Appl. No.: 08/968,074

[22] Filed: Nov. 12, 1997

[51] Int. Cl.$^6$ .................................................. G01P 15/00
[52] U.S. Cl. ....................................................... 73/514.34
[58] Field of Search ........................... 73/514.34, 514.35, 73/514.36, 514.16, 514.01; 310/311, 328, 329, 330, 340, 344, 368

[56] References Cited

U.S. PATENT DOCUMENTS

| | | | |
|---|---|---|---|
| 4,333,029 | 6/1982 | Kolm et al. | 310/329 |
| 4,755,706 | 7/1988 | Harnden, Jr. et al. | 310/332 |
| 5,053,671 | 10/1991 | Kobayashi et al. | 310/329 |
| 5,128,581 | 7/1992 | Nakayama et al. | 310/329 |
| 5,130,600 | 7/1992 | Tomita et al. | 310/329 |
| 5,235,237 | 8/1993 | Leonhardt | 310/329 |
| 5,490,422 | 2/1996 | Tabota et al. | 73/514.34 |

*Primary Examiner*—Hezron Williams
*Assistant Examiner*—Richard A. Moller
*Attorney, Agent, or Firm*—Barnes & Thornburg

[57] ABSTRACT

An accelerometer element of the bender having geometrical outside dimensions and relations wherein the height and width are alike and half of the length. The accelerometer element is built from ceramic materials and consists of two half blocks with a piezoelectric bender element clamped in-between. The high part tolerances are overcome by two fastener gaps, being filled with a special material for microcomponents. This method allows tolerance differences to be compensated by the fastener gaps and its fastening layer. The half blocks consist of a ceramic material to be ground in strips and processed with electronic components in well known batch production methods. Both sides of the blocs are protected with cover plates. The connector recess is filled with a watertight sealing material. The accelerometer element, whether with or without integrated electronics, is fully hermetic and watertight, with only the signal wires protruding on the outside. The opening for the bender vibration has close tolerances to the bender in order to avoid breakage at extremely high shock application.

12 Claims, 3 Drawing Sheets

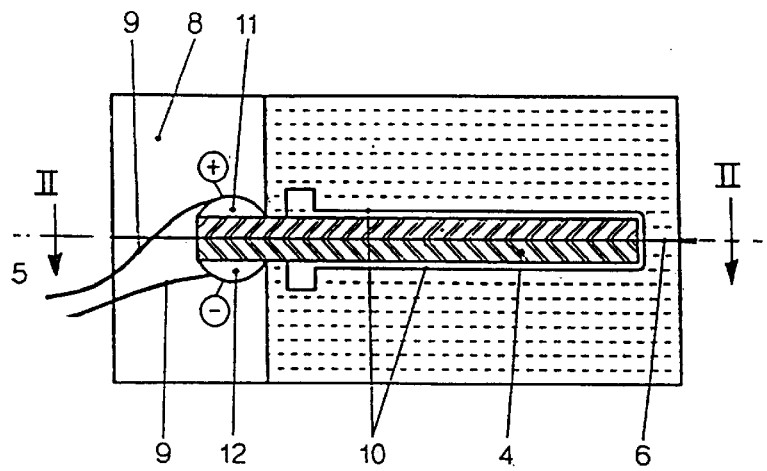
Fig.4
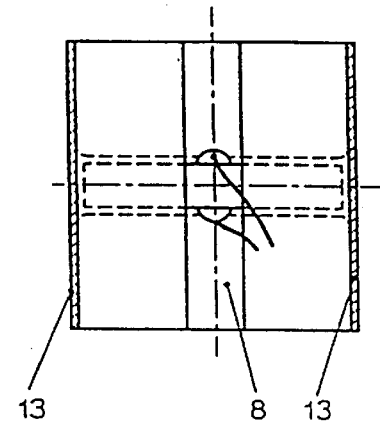
Fig.5
Fig.6
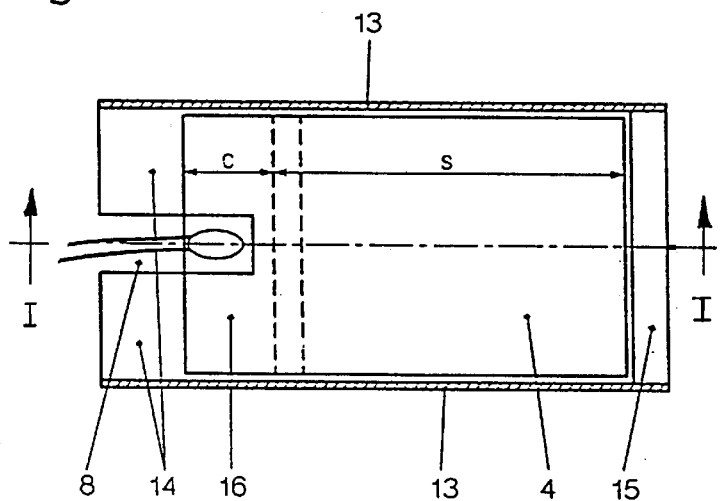
Fig.7
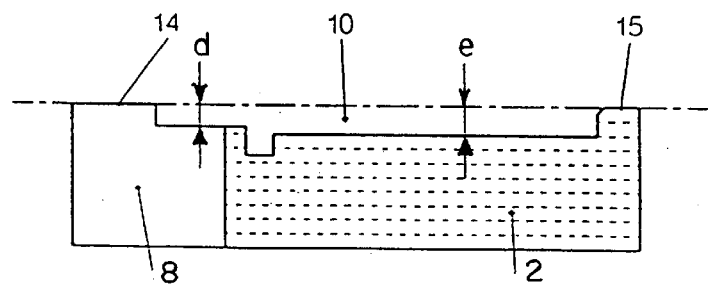

PIEZOBLOC ACCELEROMETER

BACKGROUND AND SUMMARY OF THE INVENTION

The invention refers to an accelerometer where a piezoelectric bender element is compressed and secured between two half blocks of a ceramic material (e.g. $Al_2O_3$), having two distance gaps filled by a pourable sealing material. The bender element is sealed in by two cover plates and the contact recess is filled by watertight sealing material. Thus only the signal wires protrude from the surfaces, put on by metal sputtering or other known metallizing methods.

The outside dimensions of the piezobloc are chosen for optimum electrical output, at a selected frequency range which is especially suited for modal analysis of elastic structures, where a very strong signal, at a very modest element weight, is required. For such applications, the piezoceramic element yields a signal of at least a factor 5 higher than any other shear or compression type element of similar size or weight. Due to its higher thermal sensitivity, the bender element must be thermally protected, and this may be achieved by embedding it in a low conductivity material and by protecting it with cover plates on the sides. With these precautions, satisfactory thermal stability is achieved.

The advantage of the ceramic half blocks is evident also if the sensor element is to be equipped with integrated electronics. The half blocks may be strips of a ceramic material which are processed in multiple lots and after testing are cut into single elements. This batch processing, standard in microtechnology, allows volume production at low prices.

BRIEF DESCRIPTION OF THE DRAWINGS

In order to further explain the details, the following drawings are being presented:

FIG. 4 shows the cross section I—I of a piezobloc block of FIG. 1.

FIG. 5 shows the sideview III—III of the piezobloc element of FIG. 1.

FIG. 6 shows the cross section II—II of the piezobloc block of FIG. 4.

FIG. 7 shows a cross section A—A of a half block.

DETAILED DESCRIPTION OF THE PREFERRED EMBODIMENTS

Figure 1:
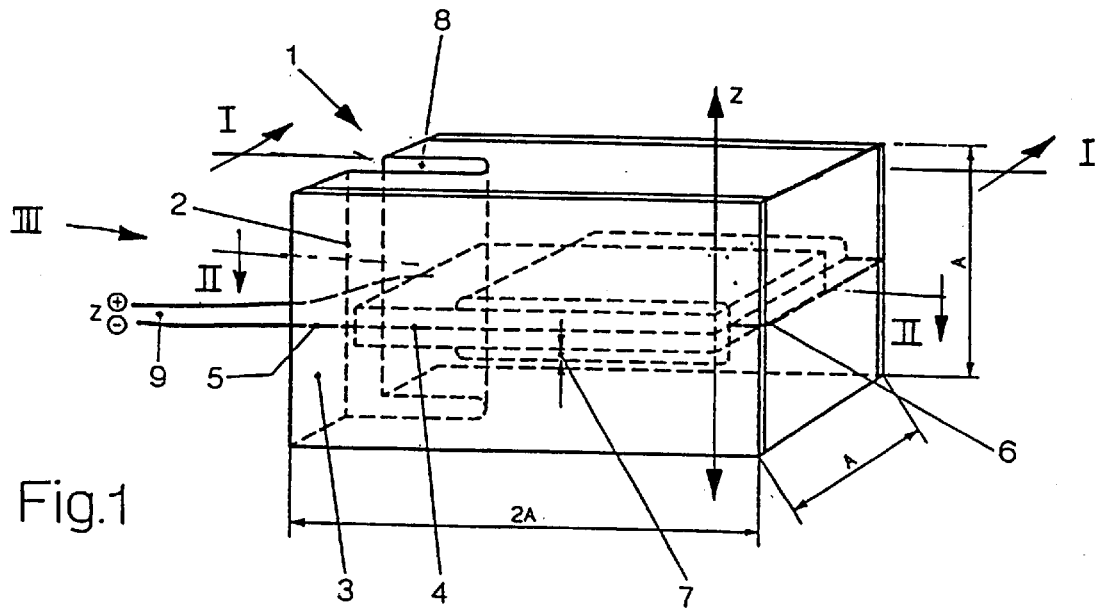
FIG. 1 is a perspective view of a piezobloc accelerometer, incorporating the principles of the present invention.

The invention of the piezobloc accelerometer 1, according to FIG. 1 consists of the upper half block 2 and the lower half block 3, both of a ceramic material, e.g. an aluminum, and fastened together by the fastener gap 5 for the bender element 4 and the fastener gap 6 for the bender clearance control. Between the two blocks, the piezoelectric bender element 4 is clamped over a certain length, while the main part is allowed to vibrate freely, according to the acceleration input in the Z direction. The bender clearance 7 is adjusted to prevent breakage of the ceramic bender by harsh shock influences.

The outside dimensions of the piezobloc element 4 represent a square A×A with block length of 2A. The block 4 can be glued to any working area on any side of the block surface.

Figure 2:
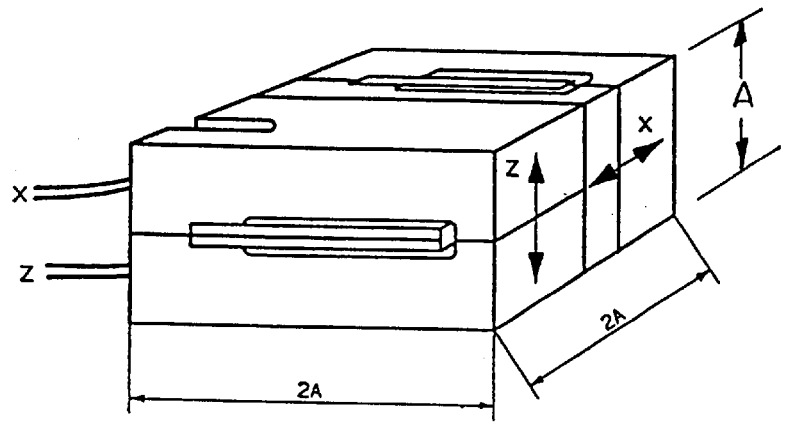
FIG. 2 is a perspective view of a two-component arrangement, side by side, resulting in a two axis element incorporating the principles of the present invention.

FIG. 2 shows a two-component arrangement for Z and X directions, resulting in a square bloc of 2A and height A.

Figure 3:
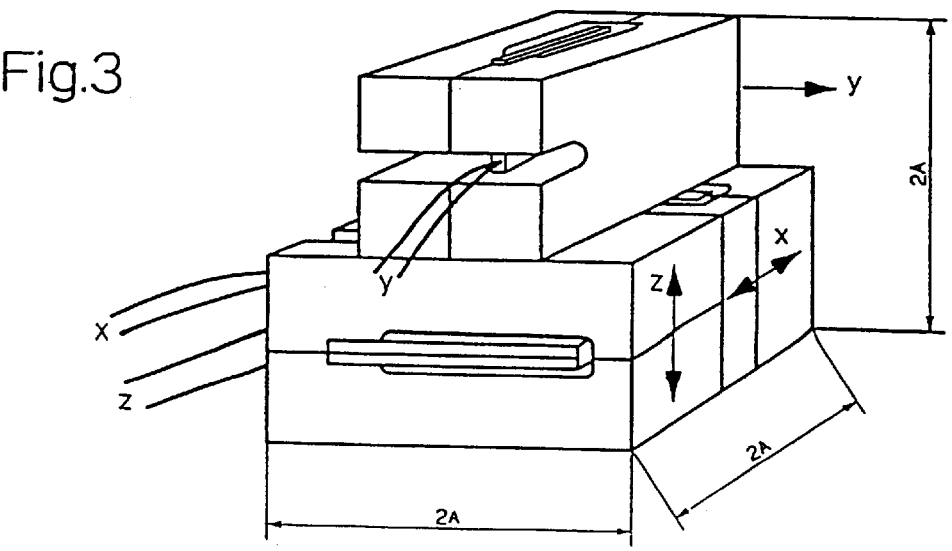
FIG. 3 is a perspective view of a three-component arrangement, allowing a very compact cube sensor.

FIG. 3 shows a possible three-component arrangement, resulting in a most compact cube of 2A side length.

FIG. 4 shows the cross section A–A of a piezobloc element with the opening 10 for the vibrating bender block 4 and the contact material 11 for the upper ⊕ surface and the same 12 for the lower ⊖ surface, both surfaces are metallized. Contact with the signal wires 9 is possible by soldering or by conductive epoxy resin. The recess or slot 8 serves for the signal wire 9 exit in any desired direction. This slot 8 will be completely filled by a pourable sealing material, such as an epoxy resin, after final tests.

FIG. 5 shows the sideview III—III of the piezobloc block with the two cover plates 13 along the length of the block, covering the opening 10 completely tight; the cover plates may be metallic or metallized for an electromagnetic shielding.

FIG. 6 snows the ground view B—B of the piezobloc block, with the piezoelectric bender element 4 in the proper position. Length C is the clamping area 16 and length S is the free vibrating part of the bender. The fastening area 14 on both sides of the slot 8 supplies the main clamping force for the bender 4. The fastening area 15 determines the clearance for the vibration of the bender 4, avoiding breakage by high shock influences. Since this clearance 7 is of high importance and within micrometers, the required tolerances are taken up by the fastener gap 6 (FIG. 4), adjusted with an assembly fixture which is not shown.

FIG. 7 shows a cross section A—A of a half block. The opening 10 for the bender vibration requires a closely tolerated dimension e, and for the clamping of the bender a dimension d. The block 2 may be a ceramic, produced by known ceramics' forming production methods.

Figure 8:
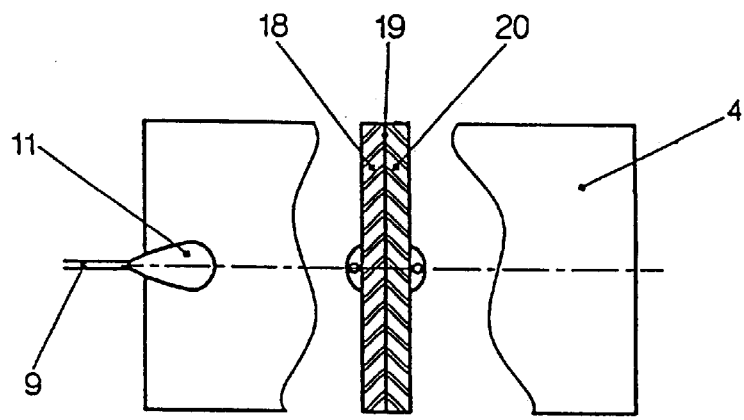
FIG. 8 shows the piezoelectric bender element in plan and cross-sectional view.

FIG. 8 shows a piezoelectric bender element 4 as available from various suppliers in desired sizes. The piezoceramic plate 18 is bonded, 19, to the piezoceramic plate 20 and metallized to connect the signal wires 9 with means of a contact material 11 to the ⊕ and ⊖ surfaces, arranged in the slot 8.

Figure 9:
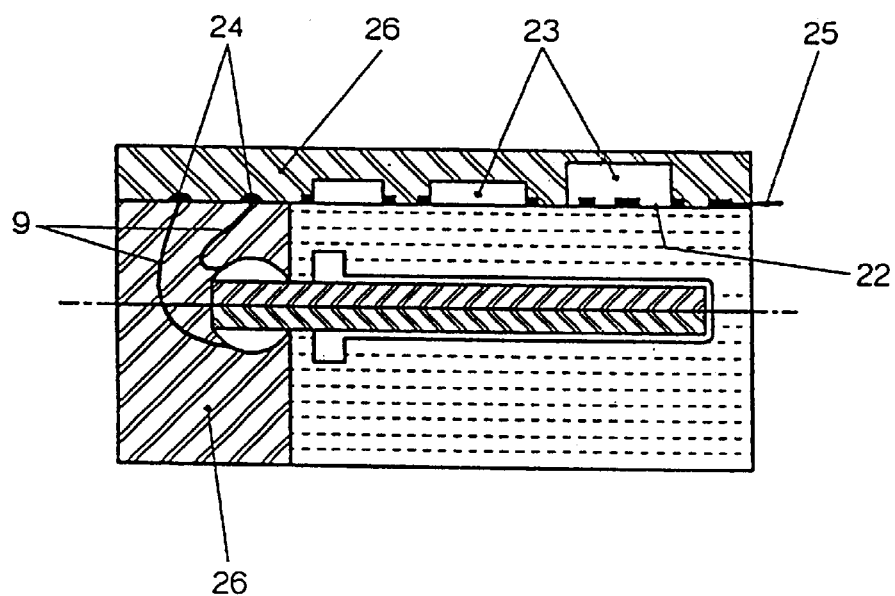
FIG. 9 shows a cross section A—A of a piezobloc block with integrated electronics.

FIG. 9 shows a cross section A—A of a piezobloc block with integrated electronics. The electronic bonding surface 22 of the substrate is processed for a multitude of sensors with electronic components 23, bonding contacts 24 and amplifier exit studs 25. After tests, all recesses or slots and electronics are covered with a sealing material, e.g. epoxy 26, to the desired dimensions. After hardening, the substrate or wafers are cut into single piezobloc block and then covered with cover plates 13 and finally metallized on the full surface. This is necessary to achieve electromagnetic shielding. The finished piezobloc accelerometers have identical block dimensions with or without integrated electronics.

We claim:

1. Piezobloc accelerometer of the bender type comprising:
   two half blocks of a ceramic material of low thermal conductivity;

a piezoelectric bender element clamped in-between the half blocks;

the blocks having a first fastener gap for mounting the bender elements and a second fastener gap for the bender element clearance between the half blocks.

2. Accelerometer according to claim 1, including two cover plates with outside dimensions of the piezobloc accelerometer, the dimensions of which being A×2A.

3. Accelerometer according to claim 2, wherein the cover plates are metallized on their outside surfaces.

4. Accelerometer according to claim 1, including a recess for the signal wires.

5. Accelerometer according to claim 4, wherein a surface of one of the blocks is a base for integrated electronics, and the electronics are connected within the recess with the piezoelectric bender element.

6. Accelerometer according to claim 1, wherein electronics are integrated on one of the half blocks and covered for protection by a pourable sealing material, and whereby the entire surface of the accelerometer is metallized.

7. Accelerometer according to claim 1, wherein the piezoelectric bender element is clamped along a first length with a free vibration second length and contacted through the recess.

8. Accelerometer according to claim 1 wherein the clearance of the bender element in the second fastener gap is dimensioned to avoid breakage of the piezoelectric bender element.

9. Accelerometer according to claim 1, wherein a fastening area mainly is used to adjust the bender clearance to proper position.

10. Accelerometer according to claim 1, wherein the first and second fastener gaps are filled with an epoxy resin.

11. Accelerometer according to claim 1, wherein the first and second fastener gaps are filled with a liquid glass compound.

12. Accelerometer according to claim 1, wherein the first and second fastener gaps are filled with a metal solder.

* * * * *